March 5, 1929.  J. KARMAZIN  1,704,539
METHOD OF APPLYING SOLDER
Filed May 12, 1926
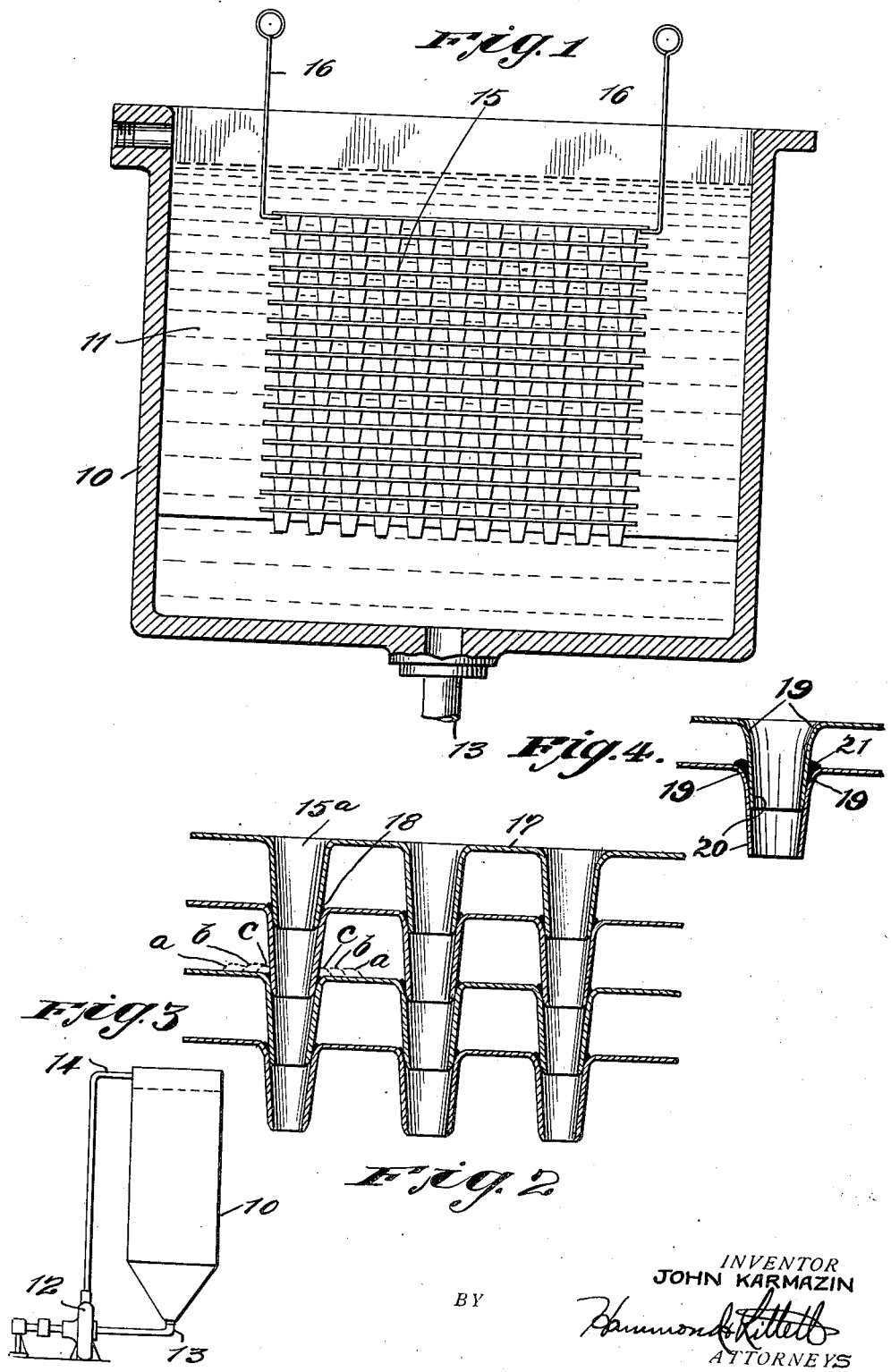
INVENTOR
JOHN KARMAZIN
BY
Hammond & Littell
ATTORNEYS Patented Mar. 5, 1929.

1,704,539

UNITED STATES PATENT OFFICE.

JOHN KARMAZIN, OF DETROIT, MICHIGAN.

METHOD OF APPLYING SOLDER.

Application filed May 12, 1926. Serial No. 108,462.

This invention relates to the method of applying and distributing solder over the seams or joints of metal to be soldered together and it relates more particularly to the method of applying solder to cores of automobile radiators.

Heretofore, it has been the practice in soldering automobile radiator cores to provide a bath of soldering flux into which the entire core is dipped, and provide a bath of molten solder into which the core is then dipped and then to allow the solder to solidify thereby sweating the joints together. With this method not only the joints but the entire surfaces of the tubes, fins, etc., of a radiator core are coated with solder which retards the radiation of heat from the core and uses up more solder than is necessary to seal the joints. Furthermore the use of molten solder necessarily causes further waste, owing to the spilling, splashing and oxidation of the molten solder.

It is one of the objects of the present invention to provide a method of soldering in which a minimum of solder may be used and at the same time each joint in the radiator core may be properly sweated together.

Another object of the invention is to provide a method in which there is no loss of solder whatever.

Another object of the invention is to provide a method of soldering radiator cores wherein, substantially all the solder is placed at the joints to be sealed and the other part of the radiator remains substantially uncoated with the solder.

Another object of the invention is to provide a method of soldering radiator cores in which the solder and the soldering flux may be applied simultaneously.

Another object of the invention is to provide a method of soldering radiator cores in which the appearance of the finished core may be altered as desired by regulating the proportions of solder in the solution.

Various other objects and advantages of the invention will appear as the description thereof proceeds.

I have illustrated my process as being used with a radiator core of the fin and tube type comprising a plurality of elements having tubular projections formed thereon which telescope with the tubular projections of adjacent elements and form water conduits through the radiator core; but it is to be understood that my process may be used with any type of radiator core where it is desired to solder together joints of a similar nature.

Figure 1 is a sectional elevation of a tank illustrating the first step of my method;

Figure 2 is a sectional elevation of a radiator core soldered with my improved method;

Figure 3 is a side elevation of one form of apparatus for practising the invention; and Figure 4 is a sectional elevation of another form of radiator soldered by my improved method.

Referring more specifically to the drawings, the apparatus used in my invention comprises a tank 10 into which is placed a suspension 11 comprising an ordinary soldering flux such as zinc chloride with which finely divided or pulverized solder is thoroughly mixed. A pump 12 is preferably connected by pipes 13 and 14 to the lower and upper portions of the tank 10 in order to circulate the suspension from the bottom of the tank 10 into the top thereof and agitate the suspension so that the solder therein will remain evenly distributed throughout the fluid. Any other suitable agitating means may be used if desired. While the amount of pulverized solder used per unit of flux suspension will vary with the type of joint desired and the cost permitted, I have found that 15 lbs. of 200 mesh pulverized solder to 30 gallons of flux or about ½ lb. of solder per gallon of flux gives best results on a core of the type disclosed. Where the core is to be finished by painting a comparatively weak suspension may be used and where a solder finish is desired on the core more solder must be used. Small amounts of additional solder or flux may be added from time to time to keep up the strength of the fluid. The radiator core 15 may be lowered into the suspension of flux and solder by hooks 16 so that the core is completely immersed in the suspension. The core may then be removed vertically from the suspension and placed in an oven where it is heated so that the flux is evaporated and the solder adhering to the surfaces of the radiator melted in order to sweat the joints 18 together. When the core 15 is drawn from the tank of soldering suspension, the suspension is free to drain off from the bottom of each element and will collect on the upper surface of each element, and particularly in any depressions thereon such as those at the joints 18 between the tubular projections. During the evaporation of the flux the surface tension of the liquid causes the suspension on each of the elements to move toward the point where the largest amount of suspension is concentrated which in this case will be at the joints 18. Thus when the core is first drawn from the bath of the suspension the suspension may lie as indicated by the dotted line "a" and as the fluid suspension dries and also by the action of surface tension the suspension will close in or recede toward the larger volume of flux at the joints 18 passing the positions "b" and "c" consecutively. This action of the fluid suspension of solder and flux in drawing in toward the joint will cause the solder in the suspension to be also drawn to and concentrated in the joint and to settle in the joint where it will lie evenly around the circumference of the joint if the core is maintained with the fins substantially horizontal. After the core is drawn from the suspension and heated, most of the solder, which was deposited in the suspension on top of the elements 17, will be in the joints 18 where it is most desired and the elements will be securely soldered together. Very little of the solder will adhere to the undersides of the elements or to the sides of the tubular projections and most of the solder in the flux on the top of the elements is concentrated at the joints 18 so that a minimum of solder is used but at the same time the joints are all tightly sweated together.

There is thus a material saving of solder, the extent of which is such that an ordinary radiator core which requires about two pounds of solder by the old method will be securely sweated together with about a half a pound of solder distributed over some 5000 joints by my improved method and a better and lighter weight core is produced.

In Figure 4 a modified form of radiator, which is the subject matter of a separate application, has been shown soldered with my improved method. In this modification the walls of the tubular projections are formed with a different radius at the upper portion 19 than at the lower portion 20 which results in a deeper cavity 21 at the joint into which the solder flux suspension may run. A greater contacting surface is therefore provided for the solder with the walls of the tube with the result that the radiator core is greatly strengthened.

There is no waste of the solder as it will remain in the suspension until taken up by one of the radiator cores being dipped therein, but solder and flux should, of course, be added to the suspension from time to time to keep the suspension at substantially an even consistency.

No particular skill is required to dip the core as it is essential only that it be completely immersed and that it be kept in a position in which the fins are substantially horizontal until after the heating step and my method therefore lends itself particularly well to dipping by means of an automatic machine or by unskilled labor.

This improved method is advantageous where it is desired to paint the outside of the radiator core and where a coating of solder is not necessary thereon. If, however, it is desired to provide a radiator core with a solder coated surface, the proportion of pulverized solder in the suspension may be increased with the result that more solder will adhere to the surface of the core and when the heating step is completed the surfaces will present a solder coated appearance.

From the above it will be evident that I have provided a method of soldering a radiator core which uses a minimum of solder, eliminates any loss of solder and produces a core with greater radiating efficiency and the steps of which may be automatically performed or performed by unskilled labor.

Many modifications and changes in the steps as described may be resorted to without departing from the spirit of the invention and I do not desire to limit myself to the particular steps described but to interpret the invention broadly within the scope of the appended claims.

What I claim as my invention is:

1. The method of soldering which comprises providing a fluid suspension of soldering flux and pulverized solder, covering the joints of the parts to be soldered by said suspension, removing said parts from said suspension and heating to melt the solder.

2. The method of soldering which comprises providing a fluid suspension of soldering flux and pulverized solder, dipping the parts to be soldered into said fluid suspension with the joints thereof in position for said suspension to flow therein, removing said parts from the suspension and retaining a portion of the suspension in said joints, and heating said parts to drive off the surplus of the suspension and melt the solder to seal said joints.

3. The method of soldering an article having a plurality of joints which comprises simultaneously depositing pulverized solder from a liquid suspension on a plurality of joints to be soldered by immersing the article in the liquid suspension and heating to sweat said solder into said joints and allowing the surplus to run off.

4. The method of soldering a radiator core which comprises providing a fluid bath of soldering flux and finely divided solder, agitating the bath, simultaneously treating all parts of the radiator core with the bath, heating the core to drive off the surplus of said bath and melting the solder, to seal the joints.

5. The method of soldering a radiator core having a plurality of joints to be soldered which comprises providing a fluid suspension of soldering flux and finely divided solder, agitating the fluid suspension, dipping the core into the suspension in an upright position to simultaneously deposit the suspension on all the joints and heating the core in the same position, to melt the solder.

6. The method of soldering a radiator core of the integral fin and tube type having a plurality of joints which comprises treating the entire core with a fluid suspension of soldering flux and finely divided solder, holding the core in such a position that the fluid suspension will be drawn by surface tension into the crevices of the joints desired to be sweated together and heating the core without substantially changing that position.

In testimony whereof, I have affixed my signature to this specification.

JOHN KARMAZIN.